(12) United States Patent
Creutz et al.

(10) Patent No.: US 7,632,890 B2
(45) Date of Patent: Dec. 15, 2009

(54) SILICONE FOAM CONTROL COMPOSITIONS

(75) Inventors: Serge Creutz, Rocourt (BE); Alain Hilberer, Waudrez (BE)

(73) Assignee: Dow Corning Corporation, Midland, MI (US)

( * ) Notice: Subject to any disclaimer, the term of this patent is extended or adjusted under 35 U.S.C. 154(b) by 74 days.

(21) Appl. No.: 10/521,321

(22) PCT Filed: Aug. 1, 2003

(86) PCT No.: PCT/EP03/09160

§ 371 (c)(1),
(2), (4) Date: Jan. 6, 2005

(87) PCT Pub. No.: WO2004/018074

PCT Pub. Date: Mar. 4, 2004

(65) Prior Publication Data

US 2005/0239908 A1    Oct. 27, 2005

(30) Foreign Application Priority Data

Aug. 16, 2002   (GB) ................ 0219073.4

(51) Int. Cl.
*C08L 83/04* (2006.01)
(52) U.S. Cl. ............ 524/588; 528/43
(58) Field of Classification Search ........ 524/588; 528/43
See application file for complete search history.

(56) References Cited

U.S. PATENT DOCUMENTS

| | | | |
|---|---|---|---|
| 4,599,189 A | 7/1986 | Wuhrmann et al. | 252/174.15 |
| 4,609,490 A | 9/1986 | Itoh et al. | 252/358 |
| 5,238,596 A | 8/1993 | Smith | 252/174.15 |
| 5,900,456 A * | 5/1999 | Hashiuchi et al. | 524/588 |
| 6,340,662 B1 | 1/2002 | Millhoff et al. | 510/417 |
| 6,417,142 B1 | 7/2002 | Chatterji et al. | 507/265 |
| 6,521,587 B1 * | 2/2003 | L'Hostis et al. | 510/466 |
| 6,610,752 B1 * | 8/2003 | Schmid et al. | 516/117 |

FOREIGN PATENT DOCUMENTS

| | | |
|---|---|---|
| DE | 198 37 195 | 2/2000 |
| DE | 199 53 797 | 5/2001 |
| EP | 0 210 731 | 3/1990 |
| EP | 0 496 510 | 3/1994 |
| EP | 0 516 109 | 5/1995 |
| EP | 0 578 424 | 12/2000 |
| EP | 1 057 926 | 12/2000 |
| EP | 1 070 526 | 1/2001 |
| EP | 1 075 863 | 2/2001 |
| EP | 1 075 864 | 2/2001 |
| GB | 1 523 957 | 9/1978 |
| WO | WO 96/34671 | 7/1996 |

* cited by examiner

*Primary Examiner*—Kuo-Liang Peng
(74) *Attorney, Agent, or Firm*—Timothy J. Troy

(57) ABSTRACT

A foam control composition comprises a polydiorganosiloxane fluid comprising units of the formula

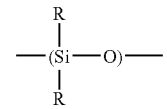

where each group R, which may be the same or different, is selected from an alkyl group having 1 to 36 carbon atoms or an aryl group or aralkyl group having up to 36 carbon atoms, the mean number of carbon atoms in the groups R being at least 1.3, and an additive composition of melting point 35 to 100° C. comprising a substantially non-polar organic material, preferably a polyol substantially fully esterified by carboxylate groups each having 7 to 36 carbon atoms.

14 Claims, No Drawings

SILICONE FOAM CONTROL COMPOSITIONS

CROSS REFERENCE TO RELATED APPLICATIONS

The present application is a US national stage filing under 35 USC 371 and claims priority from PCT application No. PCT/EP03/09160 filed on Aug. 1, 2003 and GB application No. 0219073.4 filed on Aug. 16, 2002. The above applications are incorporated by reference in their entirety.

FIELD OF THE INVENTION

This invention is concerned with silicone-based foam control compositions for use in aqueous compositions which are liable to foam. The foam control compositions of the invention can be added to detergent compositions, particularly detergent powders, to inhibit excessive foaming when the detergent is used in washing.

In many aqueous systems which are used e.g. in food processes, textile dyeing, paper production, sewage treatment and cleaning applications, the production of foam needs to be controlled or prevented. It is important to keep the foam formation to an acceptable level when laundering is performed in automatic washing machines, especially front loading machines. Excessive foam would cause overflow of the washing liquor onto the floor as well as reduction in the efficiency of the laundering operation itself. There is a move in the detergent industry towards the use of detergent compositions which will perform to a higher efficiency than hitherto. There is a need to control foam from e.g. increased surfactant levels in the detergent compositions, use of surfactants which have a higher foam profile than traditional surfactants and changing laundering conditions. It is desirable to keep the addition level of foam control compositions to a minimum. There has therefore arisen a need to develop more efficient foam control compositions for incorporation into detergent compositions.

BACKGROUND TO THE INVENTION

EP-A-1075683 describes a foam control agent comprising (A) an organopolysiloxane material having at least one silicon-bonded substituent of the formula X-Ph, wherein X denotes a divalent aliphatic hydrocarbon group and Ph denotes an aromatic group, (B) a water-insoluble organic liquid, (C) an organosilicon resin and (D) a hydrophobic filler. The water-insoluble organic liquid (B) can for example be a mineral oil, liquid polyisobutene, isoparaffinic oil or vegetable oil. EP-A-1075684 describes a foam control agent of similar composition except that it does not contain water-insoluble organic liquid (B).
EP-A-578424 describes a foam control agent which contains an polydiorganosiloxane with alkyl side chains in which each alkyl side chain contains from 9 to 35 carbon atoms. The polydiorganosiloxane is used together with a finely divided hydrophobic particulate material, for example, hydrophobic silica, and optionally an MQ organosilicon resin. EP-A-1070526 describes such a foam control composition additionally comprising a stabilizing aid which is an organic compound having a melting point of from about 40 to 80° C., preferably a fatty acid, a fatty alcohol or an alkylphosphoric acid ester.
EP-A-210731 describes a particulate foam control agent comprising a silicone antifoam and an organic material having a melting point in the range 50-85° C. which comprises a monoester of glycerol and a 12-20C fatty acid, for example glyceryl monostearate, optionally in self-emulsifying form. The glyceryl monostearate is said not to affect the effectiveness of the silicone antifoam when it is released into the washing liquor. U.S. Pat. No. 5,238,596 describes a particulate foam control agent comprising a silicone antifoam and an organic material having a melting point in the range 45-85° C. which is a fatty acid, fatty alcohol or a monoester of glycerol and a 12-20C fatty acid, and a starch carrier.

GB-A-1523957 describes a foam control substance which comprises powdered or granular sodium tripolyphosphate, sodium sulphate or sodium perborate having on the surface thereof an organopolysiloxane antifoam agent which is at least partially enclosed within a mixture of a water insoluble wax having a melting point of 55-100° C. and a water insoluble emulsifying agent.

U.S. Pat. No. 4,609,490 describes a defoaming agent for bean curd manufacture which comprises not less than 90% glycerol fatty acid monoester with additives comprising a silicone which has defoaming activity and an inorganic substance such as calcium carbonate which has weak defoaming activity and can serve as a carrier.

EP-A-516109 describes a silicone defoamer comprising polydimethylsiloxane fluid, microparticulate silica, and polysiloxanes having vinyl and Si—H groups which are capable of reaction to form a crosslinked structure. The defoamer composition may contain a polyethylene glycol compound and a fatty acid ester compound to act as a surfactant.

There is still a need to provide more efficient foam control agents. We have now surprisingly found that if efficient foam control agents based on organopolysiloxane materials are combined with certain combinations of additives, an even more efficient foam control composition can be obtained.

SUMMARY OF THE INVENTION

A foam control composition according to the present invention comprises a polydiorganosiloxane fluid comprising units of the formula

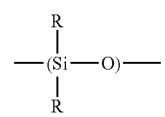

where each group R, which may be the same or different, is selected from an alkyl group having 1 to 36 carbon atoms or an aryl group or aralkyl group having up to 36 carbon atoms, the mean number of carbon atoms in the groups R being at least 1.3, and an additive composition of melting point 35 to 100° C. comprising a substantially non-polar organic material.

DETAILED DESCRIPTION OF THE INVENTION

The polydiorganosiloxane fluid preferably has no more than 5 mole % branching units such as $RSiO_{3/2}$ units or crosslink sites, most preferably less than 2 mole % branching units. The mean number of carbon atoms in the groups R is preferably at least 1.7, and is most preferably at least 2.0 if the groups R include aryl or aralkyl groups and at least 2.5 if the groups R do not include aryl or aralkyl groups. The polydiorganosiloxane fluid is preferably free from non-silicone polymer chains such as polyether chains.

One preferred example of a polydiorganosiloxane fluid is a polysiloxane comprising at least 10% diorganosiloxane units of the formula

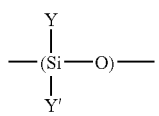

and up to 90% diorganosiloxane units of the formula

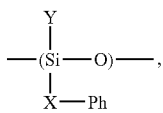

wherein X denotes a divalent aliphatic organic group bonded to silicon through a carbon atom; Ph denotes an aromatic group; Y denotes an alkyl group having 1 to 4 carbon atoms; and Y' denotes an aliphatic hydrocarbon group having 1 to 24 carbon atoms, as described in EP1075684. The diorganosiloxane units containing a -X-Ph group preferably comprise 5 to 40%, of the diorganosiloxane units in the fluid. The group X is preferably a divalent alkylene group having from 2 to 10 carbon atoms, most preferably 2 to 4 carbon atoms, but can alternatively contain an ether linkage between two alkylene groups or between an alkylene group and -Ph, or can contain an ester linkage. Ph is most preferably a phenyl group, but may be substituted for example by one or more methyl, methoxy, hydroxy or chloro group, or two substituents R may together form a divalent alkylene group, or may together form an aromatic ring, resulting in conjunction with the Ph group in e.g. a naphthalene group. A particularly preferred X-Ph group is 2-phenylpropyl—$CH_2$—$CH(CH_3)$—$C_6H_5$. The group Y is preferably methyl but can be ethyl, propyl or butyl. The group Y' preferably has 1 to 18, most preferably 2 to 16, carbon atoms, for example ethyl, methyl, propyl, isobutyl or hexyl.

Mixtures of alkyl groups Y' can be used, for example ethyl and methyl, or a mixture of dodecyl and tetradecyl. Other groups may be present, for example haloalkyl groups such as chloropropyl, acyloxyalkyl or alkoxyalkyl groups or aromatic groups such as phenyl bonded direct to Si.

The polysiloxane fluid containing -X-Ph groups may be a substantially linear siloxane polymer or may have some branching, for example branching in the siloxane chain by the presence of some tri-functional siloxane units, or branching by a multivalent, e.g. divalent or trivalent, organic or silicon-organic moiety linking polymer chains, as described in EP-A-1075684.

An alternative example of a preferred polydiorganosiloxane fluid is a polysiloxane comprising 50-100% diorganosiloxane units of the formula

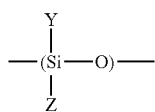

wherein Y denotes an alkyl group having 1 to 4 carbon atoms, preferably methyl or ethyl, and Z denotes an alkyl group having 6 to 18, preferably 6-12 carbon atoms, for example octyl, hexyl, heptyl or decyl. Such a polysiloxane fluid can optionally contain up to 50% diorganosiloxane units of the formula

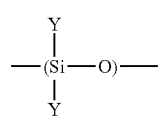

It is preferred that the number of siloxane units (DP or degree of polymerisation) in the average molecule of the polysiloxane fluid of either of the above types is at least 5, more preferably from 10 to 5000. Particularly preferred are polysiloxanes with a DP of from 20 to 1000, more preferably 20 to 200. The end groups of the polysiloxane can be any of those conventionally present in siloxanes, for example trimethylsilyl end groups.

The polydiorganosiloxane fluid containing -X-Ph groups, or the polydiorganosiloxane fluid containing -Z groups, is preferably present as at least 80% by weight of the polysiloxane fluid content of the foam control composition, most preferably as 100% or more than 95% of the polysiloxane fluid. The polysiloxane fluid containing -X-Ph groups, or the polysiloxane fluid containing -Z groups, can contain polydimethylsiloxane or another known silicone antifoam fluid, preferably at less than 20%, most preferably less than 5%, by weight of total polysiloxane fluid.

The polydiorganosiloxane fluid can alternatively be a polydiorganosiloxane in which the organic groups are substantially all alkyl groups having 2 to 4 carbon atoms, for example polydiethylsiloxane. Such polydiorganosiloxane fluids are however not preferred, since foam control agents based on them are less efficient in controlling foaming from modem detergent powders than those described in EP-A-1075684. The polydiorganosiloxane fluid should not consist wholly or mainly of polydimethylsiloxane (PDMS). Foam control agents based on them are less efficient in controlling foaming than those described in EP-A-1075684, and PDMS is immiscible with most organic materials, particularly those of melting point above 35° C.

The non-polar organic material preferably has a melting point of 35 to 100° C. and should preferably be miscible with the polydiorganosiloxane fluid. By 'miscible', we mean that materials in the liquid phase (i.e., molten if necessary) mixed in the proportions in which they are present in the foam control composition do not show phase separation. This can be judged by the clarity of the liquid mixture in the absence of any filler or resin. If the liquids are miscible the mixture is clear and remains as one phase. If the liquids are immiscible the mixture is opaque and separates into two phases upon standing. The non-polar organic material preferably has a melting point of at least 45° C.

The non-polar organic material of melting point 35 to 100° C. is preferably a polyol ester which is a polyol substantially fully esterified by carboxylate groups each having 7 to 36 carbon atoms. The polyol ester is preferably a glycerol triester or an ester of a higher polyol such as pentaerythritol or sorbitol, but can be a diester of a glycol such as ethylene glycol or propylene glycol, preferably with a fatty acid having at least 14 carbon atoms, for example ethylene glycol distearate. Examples of preferred glycerol triesters are glycerol tripalmitate, which is particularly preferred, glycerol tristearate and glycerol triesters of saturated carboxylic acids having 20 or 22 carbon atoms such as the material of melting point 54° C. sold under the Trade Mark 'Synchrowax HRC', believed to be mainly triglyceride of $C_{22}$ fatty acid with some $C_{20}$ and $C_{18}$ chains. Alternative suitable polyol esters are esters of pentaerythritol such as pentaerythritol tetrabehenate and pentaerythritol tetrastearate. The polyol ester can advantageously contain fatty acids of different chain length, which is common in natural products. Most preferably the polyol ester is substantially fully esterified by carboxylate groups each having 14 to 22 carbon atoms. By "substantially fully esterified" we mean that for a diol such as ethylene glycol or a triol such as glycerol, at least 90% and preferably at least 95% of the hydroxyl groups of the polyol are esterified. Higher polyols, particularly those such as pentaerythritol which show steric hindrance, may be "substantially fully esterified" when at least 70 or 75% of the hydroxyl groups of the polyol are esterified; for example pentaerythritol tristearate has the effect of a fully esterified polyol ester.

The additive composition can comprise a mixture of polyol esters, for example a mixture containing carboxylate groups of different carbon chain length such as glyceryl tristearate and glyceryl tripalmitate, or glyceryl tristearate and Synchrowax HRC, or ethylene glycol distearate and Synchrowax HRC. Foam control compositions containing mixtures of two polyol esters in the additive composition may give greater foam control efficiency than compositions containing either polyol ester alone as the additive. Mixtures containing glyceryl tripalmitate as at least 30% by weight of the polyol ester are particularly preferred, for example mixtures of glyceryl tripalmitate and glyceryl tristearate in weight ratio 30:70 to 80:20 have been found to be particularly effective in some compositions.

The additive composition can comprise the polyol ester (A) together with a more polar component (B) which contains groups more polar than the groups present in polyol ester (A). The more polar group preferably contains an active hydrogen atom, that is one liable to undergo hydrogen bonding. Examples of more polar groups are unesterified —OH groups (alcohol or phenol groups), unesterifed —COOH groups, amide groups or amino groups. The more polar component (B) may have a melting point of at least 35° C., for example in the range 45-110° C., or may have a lower melting point, for example it may be liquid provided that the mixture of (A) and (B) has a melting point of at least 35° C. The more polar component (B) is miscible with the polyol ester (A) and, although in many cases it s preferred that the more polar component (B) is miscible with the polydiorganosiloxane fluid, this is not essential. The component (B) should be miscible with or stably dispersed in the mixture of polysiloxane fluid and polyol ester (A).

Examples of components (B) containing alcohol groups include long chain primary, secondary or tertiary alcohols including fatty alcohols, ethoxylated fatty alcohols, ethoxylated fatty acids, ethoxylated alkyl phenols and partial esters of polyols. The alcohols preferably contain 8 to 32 carbon atoms such as lauryl alcohol, a branched C32 alcohol sold under the Trade Mark Isofol32 believed to comprise 2-tetradecyloctadecanol, a branched C12 alcohol sold under the Trade Mark Isofol 12 believed to comprise 2-butyloctanol, a branched C20 alcohol sold under the Trade Mark Isofol 20 believed to comprise 2-octyldodecanol, stearyl alcohol, behenyl alcohol or oleyl alcohol. The ethoxylated fatty alcohols preferably contain 1 to 10 oxyethylene units and the alkyl group of the fatty alcohol preferably contains 14 to 24 carbon atoms, for example "Volpo S2" (Trade Mark) which is an ethoxylated stearyl alcohol containing an average of 2 oxyethylene units per molecule, or "Volpo CS5" (Trade Mark) which is an ethoxylated mixture of hexadecyl and stearyl alcohols having an average of 5 oxyethylene units per molecule. or a hydrogenated tallow alcohol ethoxylate. The ethoxylated fatty acids preferably contain 1 to 10 oxyethylene units and the alkyl group of the fatty acid preferably contains 14 to 24 carbon atoms. The ethoxylated alkyl phenols preferably contain 1 to 10 oxyethylene units and the alkyl group attached to the phenol nucleus preferably contains 6 to 12 carbon atoms, for example ethoxylated octylphenol or ethoxylated nonylphenol. The linear or branched long chain alkanols such as dodecanol, 2-butyloctanol and 2-octyldodecanol are generally miscible with the polydiorganosiloxane fluid, but the ethoxylated alcohols generally are not.

Partial esters of polyols useful as component (B) include monoesters or diesters of glycerol and a carboxylic acid having 8 to 30 carbon atoms, for example glycerol monostearate, glycerol monolaurate or glycerol distearate. Mixtures of monoesters and diesters of glycerol can be used. Partial esters of other polyols are also useful, for example propylene glycol monopalmitate, sorbitan monostearate, sorbitan monooleate or ethylene glycol monostearate. The partial esters of polyols are generally not miscible with the polydiorganosiloxane fluid.

Examples of components (B) containing phenol groups are alkyl phenols having one or more alkyl substituent and preferably containing a total of 6 to 12 carbon atoms in the alkyl substituent or substituents attached to the phenol nucleus, for example octylphenol or nonylphenol or di(t-butyl)phenol. The alkylphenols are generally miscible with the polydiorganosiloxane fluid.

Examples of components (B) containing unesterified —COOH groups are fatty acids having 8 to 36 carbon atoms, for example stearic acid, palmitic acid, behenic acid, oleic acid or 12-hydroxystearic acid. Mixtures of fatty acids can be used. Examples of components (B) containing amide groups are monoamides of fatty acids having 12 to 36 carbon atoms, for example stearamide or the amides sold under the Trade Mark 'Crodamide SR', 'Crodamide ER' (believed to be erucamide) 'Crodamide OR' (believed to be oleamide) and 'Crodamide BR' (believed to be behenamide). These amides are generally not soluble in the polydiorganosiloxane fluid. Examples of components (B) containing amino groups are alkyl amines having 8 to 30 carbon atoms such as 1-octylamine and 1-dodecylamine or stearylamine.

More than one component (B) can be used, for example a mixture of a glyceryl monocarboxylate and a glyceryl dicarboxylate or a mixture of either of these with an optionally ethoxylated fatty alcohol.

The more polar component (B) can in general comprise up to 50% by weight, for example from 5% to just less than 50% by weight of the mixture of polyol ester (A) and component (B).

The non-polar organic material of melting point 35 to 100° C. can alternatively be a hydrocarbon wax, for example it can comprise at least one paraffin wax, optionally blended with microcrystalline wax, for example the wax sold under the Trade Mark 'Cerozo'. The non-polar organic material of melting point 35 to 100° C. can alternatively be an ether.

The additive composition is preferably present in the foam control composition at 10-200% by weight based on the polydiorganosiloxane fluid, most preferably 20 up to 100 or 120%.

The foam control composition preferably contains a hydrophobic filler dispersed in the polydiorganosiloxane fluid. The hydrophobic filler is not essential for washing at a temperature below the melting point of the additive composition, but is preferred for good foam control when washing at higher temperatures. Hydrophobic fillers for foam control agents are well known and are particulate materials which are solid at 100° C. such as silica, preferably with a surface area as measured by BET measurement of at least 50 $m^2/g$., titania, ground quartz, alumina, an aluminosilicate, an organic wax, e.g. polyethylene wax or microcrystalline wax, zinc oxide, magnesium oxide, a salt of an aliphatic carboxylic acids, a reaction product of an isocyanate with an amine, e.g. cyclohexylamine, or an alkyl amide such as ethylenebisstearamide or methylenebisstearamide. Mixtures of two or more of these can be used.

Some of the fillers mentioned above are not hydrophobic in nature, but can be used if made hydrophobic. This could be done either in situ (i.e. when dispersed in the polysiloxane fluid), or by pre-treatment of the filler prior to mixing with the polysiloxane fluid. A preferred filler is silica which is made hydrophobic. Preferred silica materials are those which are prepared by heating, e.g. fumed silica, or precipitation. The silica filler may for example have an average particle size of 0.5 to 50 µm, preferably 2 to 30 and most preferably 5 to 25 µm. It can be made hydrophobic by treatment with a fatty acid, but is preferably done by the use of methyl substituted organosilicon materials such as dimethylsiloxane polymers which are end-blocked with silanol or silicon-bonded alkoxy groups, hexamethyldisilazane, hexamethyldisiloxane or organosilicon resins containing $(CH_3)_3SiO_{1/2}$ groups. Hydrophobing is generally carried out at a temperature of at least 100° C. Mixtures of fillers can be used, for example a highly hydrophobic silica filler such as that sold under the Trade Mark 'Sipemat D10' can be used together with a partially hydrophobic silica such as that sold under the Trade Mark 'Aerosil R972'.

The amount of hydrophobic filler in the foam control composition of the invention is preferably 0.5-50% by weight based on the polysiloxane fluid, more preferably from 1 up to 10 or 15% and most preferably 2 to 8%.

The foam control composition preferably contains an organosilicon resin which is associated with the polydiorganosiloxane fluid. Such an organosilicon resin can enhance the foam control efficiency of the polysiloxane fluid. This is particularly true for polysiloxane fluids containing -X-Ph groups, as described in EP-A-1075684, and is also true for polysiloxane fluids containing -Z groups. In such polysiloxane fluids, the resin modifies the surface properties of the fluid. The additive composition comprising (A) and (B) is particularly effective when used in foam control compositions containing an organosilicon resin, and can markedly improve the foam control efficiency even from the highly efficient foam control agents described in EP-A-1075684.

The organosilicon resin is generally a non-linear siloxane resin and preferably consists of siloxane units of the formula $R'_aSiO_{4-a/2}$ wherein R' denotes a hydroxyl, hydrocarbon or hydrocarbonoxy group, and wherein a has an average value of from 0.5 to 2.4. It preferably consists of monovalent trihydrocarbonsiloxy (M) groups of the formula $R''_3SiO_{1/2}$ and tetrafunctional (Q) groups $SiO_{4/2}$ wherein R'' denotes a monovalent hydrocarbon group. The number ratio of M groups to Q groups is preferably in the range 0.4:1 to 2.5:1 (equivalent to a value of a in the formula $R'_aSiO_{4-a/2}$ of 0.86 to 2.15), more preferably 0.4:1 to 1.1:1 and most preferably 0.5:1 to 0.8:1 (equivalent to a=1.0 to a=1.33).

The organosilicon resin (C) is preferably a solid at room temperature. The molecular weight of the resin can be increased by condensation, for example by heating in the presence of a base. The base can for example be an aqueous or alcoholic solution of potassium hydroxide or sodium hydroxide, e.g. a solution in methanol or propanol. A resin comprising M groups, trivalent $R''SiO_{3/2}$ (T) units and Q units can alternatively be used, or up to 20% of units in the organosilicon resin can be divalent units $R''_2SiO_{2/2}$. The group R'' is preferably an alkyl group having 1 to 6 carbon atoms, for example methyl or ethyl, or can be phenyl. It is particularly preferred that at least 80%, most preferably substantially all, R'' groups present are methyl groups. The resin may be a trimethyl-capped resin. Other hydrocarbon groups may also be present, e.g. alkenyl groups present for example as dimethylvinylsilyl units, most preferably not exceeding 5% of all R'' groups. Silicon bonded hydroxyl groups and/or alkoxy, e.g. methoxy, groups may also be present.

The organosilicon resin is preferably present in the antifoam at 1-50% by weight based on the polysiloxane fluid, particularly 2-30% and most preferably 4-15%. The organosilicon resin may be soluble or insoluble in the polysiloxane fluid. If the resin is insoluble in the polysiloxane fluid, the average particle size of the resin may for example be from 0.5 to 400 µm, preferably 2 to 50 µm. The resin (C) can alternatively be added into the foam control agent in the form of solid particles, for example spray dried particles.

The foam control composition of the invention can additionally contain a hydrophobic organic liquid as an auxiliary foam control agent, for example a mineral oil, especially hydrogenated mineral oil or white oil, liquid polyisobutene, an isoparaffinic oil or petroleum jelly. The weight ratio of organopolysiloxane fluid to hydrophobic organic liquid can for example be 100/0 to 10/90, preferably 70/30 to 20/80.

The foam control compositions according to the invention may be made by combining the polysiloxane fluid and the non-polar organic material of melting point 35 to 100° C., and the more polar component (B) of the additive composition, hydrophobic filler and/or organosilicon resin if used, in any convenient way. The polysiloxane fluid, the hydrophobic filler and the organosilicon resin if used are preferably mixed together under shear. Where the filler needs to be made hydrophobic in situ, the manufacturing process includes a heating stage, preferably under reduced pressure, in which the filler and the treating agent are mixed together in part or all of polysiloxane fluid, in the presence of a suitable catalyst if required. The non-polar organic material, for example polyol ester, and optionally the more polar component (B) of the additive composition if used, can be premixed with the fluid before mixing with the filler and resin, or can be subsequently mixed with the foam control agent comprising fluid, filler and resin.

The foam control composition of the present invention is preferably supported on a particulate carrier, particularly when the composition is to be used in a powdered product such as a detergent powder. Examples of carriers and/or supports are zeolites, for example Zeolite A or Zeolite X, other aluminosilicates or silicates, for example magnesium silicate, phosphates, for example powdered or granular sodium tripolyphosphate, sodium sulphate, sodium carbonate, for example anhydrous sodium carbonate or sodium carbonate monohydrate, sodium perborate, a cellulose derivative such as sodium carboxymethylcellulose, granulated starch, clay, sodium citrate, sodium acetate, sodium sesquicarbonate, sodium bicarbonate and native starch.

We have found that the presence of the more polar component (B) markedly improves the performance of some supported foam control compositions according to the invention, although in other supported foam control compositions according to the invention component (B) is not necessary. For example, we have generally found that using an inert carrier such as starch, the polyol ester markedly improves the performance of the foam control composition without the need for a more polar component (B), whereas using a water sensitive alkaline carrier such as sodium carbonate, the polyol ester alone only gives a slight improvement in foam control whilst an additive composition comprising a polyol ester and a more polar component (B) markedly improves the performance of the foam control composition. We have found that in addition to improving foam control efficiency, the triglycerides and other polyol esters improve the stability of the foam control granules, especially granules based on a sodium carbonate carrier. Mixtures of triglycerides have been found particularly effective for both foam control and granule stability.

The polysiloxane fluid containing the hydrophobic filler and optionally the organosilicon resin is preferably mixed with the additive composition and the mixture is deposited on the carrier particles in non-aqueous liquid form. The mixture is preferably deposited on the carrier particles at a temperature at which the additive composition is liquid, for example a temperature in the range 40-100° C. As the mixture cools on the carrier particles, it solidifies to a structure having partially separated phases which contributes to the increased efficiency of the foam control composition. In an alternative process, the polysiloxane fluid, the hydrophobic filler, the organosilicon resin if present and the additive composition are emulsified in water and the resulting aqueous emulsion is deposited on the carrier particles. The supported foam control composition is preferably made by an agglomeration process in which the foam control composition is sprayed onto the carrier particles while agitating the particles. The particles are preferably agitated in a high shear mixer through which the particles pass continuously. In one preferred process, the particles are agitated in a vertical, continuous high shear mixer in which the foam control composition is sprayed onto the particles. One example of such a mixer is a Flexomix mixer supplied by Hosokawa Schugi.

The supported foam control composition may additionally include a water-soluble or water-dispersible binder to improve the stability of the particles. The polyol ester and any more polar component (B) of the additive composition may act as a binder to some extent but a further binder can be added to provide extra handling stability if required. Examples of binders are polycarboxylates, for example polyacrylic acid or a partial sodium salt thereof or a copolymer of acrylic acid, for example a copolymer with maleic anhydride, polyoxyalkylene polymers such as polyethylene glycol, which can be applied molten or as an aqueous solution and spray dried, reaction products of tallow alcohol and ethylene oxide, or cellulose ethers, particularly water-soluble or water-swellable cellulose ethers such as sodium carboxymethylcellulose, or sugar syrup binders such as Polysorb 70/12/12 or LYCASIN 80/55 HDS maltitol syrup or Roclys C1967 S maltodextrin solution. The water-soluble or water-dispersible binder can be mixed with the foam control composition before being deposited on the carrier, but preferably is separately deposited on the carrier particles. In one preferred procedure the foam control composition is deposited on the carrier particles as a non-aqueous liquid at a temperature in the range 40-100° C. and the water-soluble or water-dispersible binder is deposited on the carrier from a separate feed at the same time, or subsequently, or at both times, as an aqueous solution or dispersion.

The supported foam control composition may optionally contain a surfactant to aid dispersion of the foam control composition in the binder and/or to help in controlling the "foam profile", that is in ensuring that some foam is visible throughout the wash without overfoaming. Examples of surfactants include silicone glycols, or fatty alcohol ether sulphate or linear alkylbenzene sulphonate which may be preferred with a polyacrylic acid binder. The surfactant can be added to the foam control composition undiluted before the silicone is deposited on the carrier, or the surfactant can be added to the binder and deposited as an aqueous emulsion on the carrier.

The foam control composition can alternatively be provided in the form of an oil-in-water emulsion using any of the surfactants described in EP-A-1075684. Alternatively the foam control agent can be provided as a water-dispersible composition in a water-dispersible vehicle such as a silicone glycol or in another water-miscible liquid such as ethylene glycol, polyethylene glycol, propylene glycol, a copolymer of ethylene glycol and propylene glycol, an alcohol alkoxylate, an alkoxyalkanol or hydroxyalkyl ether or an alkylphenol alkoxylate.

The foam control compositions of the invention can contain additional ingredients such as a density adjuster, a colour preservative such as a maleate or fumarate, e.g. bis(2-methoxy-1-ethyl)maleate or diallyl maleate, an acetylenic alcohol, e.g. methyl butynol, cyclooctadiene, or cyclic methyl vinyl siloxane which reacts with any residual Pt catalyst present, a thickening agent such as carboxymethyl cellulose, polyvinyl alcohol or a hydrophilic or partially hydrophobed fumed silica, or a colouring agent such as a pigment or dye.

The foam control agents according to this invention are useful for reducing or preventing foam formation in aqueous systems, particularly foam generated by detergent compositions during laundering, and are particularly useful in detergent compositions which have a high foaming characteristic, for example those based on high levels of anionic surfactants, e.g. sodium dodecyl benzene sulphonate to ensure effectiveness of detergent composition at lower washing temperatures, e.g. 40° C. The foam control agents may also be employed in such processes as paper making and pulping processes, textile dyeing processes, cutting oil, coatings and other aqueous systems where surfactants may produce foam.

The following examples illustrate the invention. All parts and percentages are expressed by weight unless otherwise stated.

EXAMPLE 1

6% by weight treated precipitated silica (Sipernat® D10) and 1% R972 partially hydrophobic silica (both supplied by Degussa) were dispersed in 86.3% polydiorganosiloxane fluid having a degree of polymerisation of 60 and comprising 80 mole % methyl ethyl siloxane groups, 20 mole % methyl 2-phenylpropyl (derived from α-methylstyrene) siloxane groups and 1 mole % divinyl crosslinking groups. The mean number of carbon atoms in the groups R in the polydiorganosiloxane is 2.2. 6.7% by weight of a 60% by weight solution of an organosiloxane resin having trimethyl siloxane units and $SiO_2$ units in a M/Q ratio of 0.65/1 in octyl stearate (70% solid) was added. The mixture was homogenised through a high shear mixer to form a foam control compound FC1.

15 parts by weight of the silicone foam control agent FC1 was mixed at 80° C. with 7.5 parts of glyceryl tripalmitate and was sprayed onto 77.5 parts by weight of a starch powder carrier in a granulating mixer to produce a supported foam control composition.

EXAMPLE 2

Example 1 was repeated using an equal weight of a 60/40 by weight blend of glyceryl tripalmitate and glyceryl tristearate in place of the glyceryl tripalmitate.

EXAMPLE 3

Example 1 was repeated using Synchrowax HRC glyceryl triester in place of the glyceryl tripalmitate.

EXAMPLE 4

Example 3 was repeated except that 20% of the Synchrowax HRC was replaced by an equal weight of the glyceryl tripalmitate and glyceryl tristearate mixture of Example 2.

The foam control agents of Examples 1 to 4 were tested in a powder detergent formulation which comprised 327 parts by weight zeolite, 95 parts of a 55% aqueous solution of sodium dodecylbenzenesulphonate, 39 parts ethoxylated lauryl stearyl alcohol, 39 parts sodium sulphate, 125 parts sodium carbonate and 125 parts sodium perborate. Each foam control composition was used at a concentration of 0.1% by weight FC1 based on detergent composition. The evaluation was made in a Miele 934 front loading washing machine, loaded with 16 cotton towels, 100 g of the detergent formulation, 17 liters of water of 9 degree German hardness using a wash cycle of 42 minutes and 4 rinses R1 to R4 at 40° C. The foam height was measured every 5 minutes during the wash cycle and recorded, where the value indicated is the foam height in the washing machine, with 100% referring to the fact that the window of the machine was full of foam, 50%, that is was half full of foam.

The maximum foam height observed during the wash was:

Example 1: 60

Example 2: 30

Example 3: 65

Example 4: 40

The foam control compositions of the invention containing glyceryl triester as additive thus showed good foam control (excellent in Examples 2 and 4) when used at the low level of 0.1% by weight FC1 based on detergent composition.

By comparison, when the glycerol triester of Example 1 was replaced by glyceryl monostearate (GMS; 90% pure) to form a comparison foam control composition C1, the maximum foam height in the washing machine reached 100. This comparative experiment was repeated using three times the level of C1; the foam height reached 70 even at this increased concentration of 0.3% by weight FC1 based on detergent composition.

EXAMPLES 5 TO 8

13 parts by weight of the silicone foam control agent FC1 was mixed at 80° C. with 7 parts of an additive composition comprising 'Synchrowax HRC' glyceryl triester and octylphenol (OP) in various ratios as shown in Table 1. The resulting liquid foam control composition was in each case sprayed onto 80 parts by weight of a starch powder carrier in a granulating mixer to produce a supported foam control composition.

In comparative experiment C2, 7 parts by weight octylphenol was mixed with 13 parts FC1 and sprayed onto 80 parts starch carrier to produce a supported foam control composition.

EXAMPLE 9

Example 6 was repeated using nonylphenol (NP) in place of octylphenol.

The foam control compositions of Examples 5 to 9 were tested as for Examples 1 to 4. C2 was tested at a concentration of 0.3% by weight FC1 based on detergent composition. The results are described in Table 1.

TABLE 1

| Example | Wt. Ratio HRC/OP | FC1 conc. | Foam height after . . . minutes | | | | | | | |
|---|---|---|---|---|---|---|---|---|---|---|
| | | | 5 | 10 | 15 | 20 | 25 | 30 | 35 | 40 | 42 |
| 1 | 60/40 | 0.1% | 0 | 0 | 0 | 0 | 0 | 0 | 0 | 5 | 10 |
| 2 | 80/20 | 0.1% | 0 | 0 | 0 | 0 | 0 | 0 | 0 | 10 | 10 |
| 3 | 90/10 | 0.1% | 0 | 0 | 0 | 0 | 0 | 5 | 10 | 10 | 15 |
| 4 | 95/5 | 0.1% | 0 | 0 | 0 | 0 | 5 | 10 | 20 | 30 | 30 |
| 5 | 80/20 NP | 0.1% | 0 | 0 | 0 | 0 | 0 | 20 | 30 | 30 | 30 |
| C2 | 0/100 | 0.3% | 0 | 0 | 0 | 10 | 30 | 50 | 60 | 70 | 70 |

The foam control agents containing additive compositions comprising octylphenol as well as HRC glyceryl triester showed improved performance over compositions only containing HRC as additive, despite the poor effect of octylphenol used alone as additive.

EXAMPLE 10

4% by weight Sipernat® D10 and 1% by weight R972 partially hydrophobic silica were dispersed in 88.3% poly (methyl octyl siloxane) fluid having a degree of polymerisation of 60. 6.7% of the M/Q resin solution described in Example 1 was added. The mixture was homogenised through a high shear mixer to form a foam control compound FC2.

13.5 parts by weight FC2 was mixed at 80° C. with an additive composition comprising 7 parts 'Synchrowax HRC'. The resulting liquid mixture was sprayed onto 79.5 parts by weight starch powder in a granulating mixer to produce a supported foam control composition.

EXAMPLE 11

Example 10 was repeated using an additive composition comprising 5.6 parts 'Synchrowax HRC' and 1.4 parts dodecanol.

In a comparative example C3, glyceryl monostearate was used in place of the Synchrowax HRC of Example 10.

The supported foam control compositions of Examples 10 and 11 and of comparative example C3 were tested in a wash test as described in Examples 1 to 4 at a concentration of 0.3% by weight FC2 based on detergent composition. The maximum foam height recorded for Example 10 was 20, and for Example 11, no foam at all was observed (foam height 0). Comparative example C3 recorded a maximum foam height of 100. The Example 11 composition as also tested at a concentration of 0.1% by weight FC2 based on detergent composition and even at this very low concentration showed a maximum foam height of 40.

EXAMPLE 12

14.4 parts by weight FC1 was mixed at 80° C. with 14.9 parts glyceryl tristearate (GTS) as additive composition. The resulting liquid mixture was sprayed onto 69 parts by weight sodium carbonate powder in a granulating mixer to produce a supported foam control composition.

EXAMPLES 13 AND 14

Supported foam control compositions were produced as described in Example 12 using additive compositions comprising various proportions of GMS (90% pure) and GTS, as shown in Table 2.

EXAMPLE 15

A supported foam control composition was produced as described in Example 12 using as the additive composition a mixture of 58% by weight GTS with 18% GMS and 24% glyceryl distearate (GDS).

COMPARATIVE EXAMPLES C4 AND C5

Comparative Example C4 was produced by the process of Example 12 but using PEG 4000 polyethylene glycol binder in place of the GTS used in Example 12. Comparative Example C5 was produced by the process of Example 12 but using GMS 90 in place of the GTS used in Example 12.

COMPARATIVE TESTS

The supported foam control compositions of Examples 12 to 22 and comparative examples C4 and C5 were tested in a commercial powder detergent formulation based on anionic and nonionic surfactants and having a high surfactant concentration. Each supported foam control composition was used at 0.5% by weight of the detergent powder (0.07% by weight FC1 based on detergent powder). The wash test procedure and assessment was as described in Examples 1 to 4. The results are listed in Table 2.

Example 22—1-octadecylamine
Example 23—oleic acid
Example 24 A mixture of saturated fatty acids comprising 51% octadecanoic, 33% hexadecanoic and 11% eicosanoic sold under the Trade Mark 'Radiacid 069'

TABLE 2

| Example | Carrier | Binder | Additive | Foam Control Compound | Foam height after ... mins Wash time |||||||||
|---|---|---|---|---|---|---|---|---|---|---|---|---|---|
| | | | | | 5 | 10 | 15 | 20 | 25 | 30 | 35 | 40 | 42 |
| C4 | 70% Sodium carbonate | 15% PEG 4000 | None | 15% FC1 | 20 | 40 | 50 | 60 | 80 | 90 | 100 | 100 | 100 |
| C5 | 70.2% Sodium carbonate | None | 14.4% GMS | 15.4% FC1 | 0 | 0 | 20 | 40 | 50 | 60 | 80 | 100 | 100 |
| 12 | 70.7% Sodium carbonate | None | 14.9% GTS | 14.4% FC1 | 60 | 60 | 50 | 70 | 70 | 80 | 90 | 90 | 100 |
| 13 | 69% Sodium carbonate | None | 8% GMS + 8% GTS | 15% FC1 | 50 | 40 | 40 | 40 | 40 | 60 | 60 | 70 | 70 |
| 14 | 69.6% Sodium carbonate | None | 3.9% GMS + 11.7% GTS | 14.8% FC1 | 50 | 50 | 50 | 50 | 60 | 60 | 70 | 70 | 80 |
| 15 | 71% Sodium carbonate | None | 2.7% GMS + 3.6% GDS + 8.7% GTS | 14% FC1 | 40 | 30 | 20 | 20 | 20 | 20 | 40 | 50 | 60 |

The improvement given by the additive compositions of the invention can be seen by comparing the maximum foam height for each of the Examples of the invention with the maximum foam height of 100% in each of the comparative experiments. The comparative foam control compositions C4 and C5 are themselves highly effective foam control agents, but the level of 0.07% by weight FC 1 based on detergent powder is extremely low. In this type of granule, the use of GTS alone as additive in Example 12 did not markedly improve the foam control, but the foam control compositions of Examples 13 to 15 containing a more polar additive in addition to GTS all showed very significant improvement in foam control.

EXAMPLES 16 TO 24

Following the procedure of Example 12, 65% FC1 was mixed with 28% "Synchrowax HRC" and 7% of a more polar additive and sprayed onto a sodium carbonate carrier. The more polar additive was
Example 16—1-octadecanol
Example 17—1-dodecanol
Example 18—octylphenol
Example 19—"Isofol 20" (Trade Mark), a $C_{20}$ secondary alcohol
Example 20—oleyl alcohol
Example 21—di-tert-butylphenol

EXAMPLE 25

Following the procedure of Example 12, 65% FC1 was mixed with 28% glyceryl tristearate and 7% 1-octadecanol and sprayed onto a sodium carbonate carrier.

EXAMPLE 26

Example 24 was repeated with the variation that 44.8% of a polyacrylic acid was sprayed onto the carrier simultaneously with the composition of FC1, Synchrowax HRC and 'Radiacid 069'.

EXAMPLES 27 AND 28

Following the procedure of Examples 5 to 8, 65% FC1 was mixed with 28% "Synchrowax HRC" and 7% of a more polar additive and sprayed onto a starch carrier. The more polar additive was
Example 27—1-octadecanol
Example 28—A mixture of saturated fatty acids comprising mainly C16 to C20 acids sold under the Trade Mark 'Radiacid 068'

The granulated foam control agents of Examples 16 to 28 were added to the powder detergent described above at a concentration of 0.1% by weight FC1 based on detergent composition and evaluated in wash tests in Miele 377 washing machines each loaded with 16 cotton towels and 100 g of the detergent formulation in 17 liters of water of 9 degree German hardness using a wash cycle of 65 minutes at 40° C. The foam height was measured as described above and is recorded in Table 3 below.

The foam control composition of Example 24 was also tested at a concentration of 0.1% by weight FC1 based on detergent composition in the same washing machine using the same load in a wash cycle at 95° C. The result is shown in Table 3.

TABLE 3

| Example | Foam height after ___ minutes | | | | | | | | | | | | |
|---------|---|---|---|---|---|---|---|---|---|---|---|---|---|
|  | 5 | 10 | 15 | 20 | 25 | 30 | 35 | 40 | 45 | 50 | 55 | 60 | 65 |
| 16 | 50 | 50 | 40 | 30 | 20 | 20 | 20 | 30 | 30 | 30 | 40 | 40 | 40 |
| 17 | 0 | 0 | 0 | 0 | 0 | 10 | 20 | 30 | 40 | 40 | 50 | 60 | 60 |
| 18 | 0 | 20 | 20 | 20 | 30 | 30 | 40 | 40 | 50 | 50 | 50 | 50 | 60 |
| 19 | 0 | 20 | 20 | 20 | 20 | 20 | 30 | 30 | 40 | 40 | 50 | 50 | 50 |
| 20 | 10 | 0 | 0 | 0 | 10 | 10 | 10 | 20 | 20 | 20 | 30 | 30 | 40 |
| 21 | 80 | 70 | 70 | 30 | 10 | 10 | 20 | 30 | 40 | 50 | 50 | 50 | 50 |
| 22 | 20 | 30 | 20 | 20 | 30 | 30 | 30 | 40 | 40 | 40 | 50 | 50 | 60 |
| 23 | 50 | 50 | 40 | 20 | 30 | 30 | 30 | 30 | 40 | 40 | 50 | 50 | 50 |
| 24 at 40° C. | 60 | 70 | 60 | 50 | 40 | 30 | 30 | 30 | 40 | 40 | 40 | 50 | 60 |
| 24 at 95° C. | 60 | 20 | 20 | 20 | 10 | 0 | 0 | 10 | 20 | 30 | 50 | 60 | 70 |
| 25 | 0 | 0 | 0 | 10 | 10 | 20 | 30 | 40 | 50 | 60 | 60 | 70 | 70 |
| 26 | 20 | 40 | 40 | 20 | 20 | 20 | 30 | 40 | 40 | 40 | 40 | 40 | 40 |
| 27 | 30 | 30 | 30 | 30 | 30 | 30 | 40 | 40 | 50 | 60 | 60 | 60 | 60 |
| 28 | 70 | 50 | 40 | 10 | 10 | 20 | 20 | 30 | 30 | 40 | 40 | 50 | 50 |

The results shown in Table 2 show excellent foam control at the low level of 0.1% FC1 based on detergent composition. As a comparison, when comparison foam control composition C1, the maximum foam height in the washing machine reached 100 both at 0.1% and 0.15% FC1 based on detergent composition.

EXAMPLE 29

Following the procedure of Example 12, 65% FC1 was mixed with 35% of a paraffin wax of melting range 54 to 56° C. and sprayed onto a sodium carbonate carrier.

EXAMPLES 30 AND 31

Following the procedure of Example 12, 65% FC1 was mixed with 28% of a paraffin wax of melting range 54 to 56° C. and 7% of a more polar additive and sprayed onto a sodium carbonate carrier. The more polar additive was
Example 30—octylphenol
Example 31 A mixture of saturated fatty acids comprising mainly C16 to C20 acids sold under the Trade Mark Radi-acid 068

The granulated foam control agents of Examples 29 to 31 were added to the powder detergent described above at a concentration of 0.15% by weight FC1 based on detergent composition and evaluated in wash tests as described above in connection with Examples 16 to 28. The foam height measured is recorded in Table 4 below.

TABLE 4

| Example | Foam height after ___ minutes | | | | | | | | | | | | |
|---------|---|---|---|---|---|---|---|---|---|---|---|---|---|
|  | 5 | 10 | 15 | 20 | 25 | 30 | 35 | 40 | 45 | 50 | 55 | 60 | 65 |
| 29 | 0 | 20 | 0 | 0 | 0 | 10 | 30 | 50 | 60 | 70 | 80 | 80 | 90 |
| 30 | 0 | 0 | 0 | 0 | 0 | 0 | 10 | 20 | 30 | 50 | 60 | 70 | 70 |
| 31 | 20 | 20 | 10 | 0 | 0 | 10 | 20 | 30 | 40 | 50 | 60 | 60 | 70 |

The granulated foam control agents of Examples 29 to 31, although not quite as effective as those of Examples 16 to 28, are more effective than comparison foam control composition C1.

EXAMPLE 32

6% by weight treated precipitated silica (Sipernat® D10) was dispersed in 87.3% polydiorganosiloxane fluid having a degree of polymerisation of 60 and comprising 80 mole % methyl alkyl siloxane groups where the alkyl groups are a mixture of dodecyl and tetradecyl and 20 mole % methyl 2-phenylpropyl siloxane groups. 6.7% by weight of a 60% by weight solution of an organosiloxane resin having trimethyl siloxane units and $SiO_2$ units in a M/Q ratio of 0.65/1 in octyl stearate (70% solid) was added. The mixture was homogenised through a high shear mixer to form a foam control compound FC3.

16.6 parts by weight FC3 was mixed at 80° C. with 9.0 parts Synchrowax HRC. The resulting liquid mixture was sprayed onto 74.4 parts by weight sodium carbonate powder in a granulating mixer to produce a supported foam control composition. The supported foam control agent was added to the powder detergent described above at a concentration of 0.10% by weight FC3 based on detergent composition (Example 32a) and at a concentration of 0.05% by weight FC3 based on detergent composition (Example 32b) and evaluated in wash tests as described above in connection with Examples 16 to 28. The foam height measured is recorded in Table 5 below.

A comparison supported foam control composition C6 was prepared as described in Example 32 but using GMS as the additive in place of Synchrowax HRC. This was evaluated as described above at a concentration of 0.05% by weight FC3 based on detergent composition.

EXAMPLE 33

16.6 parts by weight FC3 was mixed at 80° C. with 7.2 parts Synchrowax HRC and 1.8 parts octylphenol. The resulting liquid mixture was sprayed onto 74.4 parts by weight sodium carbonate powder in a granulating mixer to produce a supported foam control composition and tested in the wash tests at a concentration of 0.05% by weight FC3 based on detergent composition.

TABLE 5

| Example | Concn. | Foam height after ___ minutes | | | | | | | | | | | | |
|---------|--------|---|---|---|---|---|---|---|---|---|---|---|---|---|
|  |  | 5 | 10 | 15 | 20 | 25 | 30 | 35 | 40 | 45 | 50 | 55 | 60 | 65 |
| C6 | 0.05% | 70 | 70 | 60 | 60 | 60 | 70 | 80 | 80 | 90 | 100 | 100 | 100 | 100 |
| 32a | 0.10 | 30 | 10 | 0 | 0 | 0 | 0 | 0 | 0 | 0 | 0 | 0 | 0 | 0 |
| 32b | 0.05 | 60 | 70 | 70 | 70 | 60 | 50 | 60 | 60 | 60 | 60 | 60 | 60 | 60 |
| 33 | 0.05 | 60 | 50 | 30 | 20 | 20 | 20 | 20 | 20 | 20 | 20 | 20 | 20 | 30 |

The foam control compositions of Examples 32 and 33 were effective at extremely low concentrations.

The invention claimed is:

1. A granulated foam control composition comprising:
    (i) a foam control agent comprising:
        a polydiorganosiloxane fluid comprising units of the formula

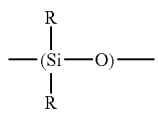

where each group R, which may be the same or different, is selected from an alkyl group having 1 to 36 carbon atoms or an aryl group or aralkyl group having up to 36 carbon atoms, the mean number of carbon atoms in the groups R being at least 1.3,
        a hydrophobic filler dispersed in the polydiorganosiloxane fluid; and
        optionally an organosilicon resin; and
    (ii) an additive composition of melting point 35 to 100° C. comprising:
        (A) a polyol ester selected from glycerol triesters, esters of pentaerythritol, or a mixture of polyol esters containing carboxylate groups of different chain length each having 7 to 36 carbon atoms, wherein at least 90% of the hydroxyl groups of the glycerol triesters are esterified, and wherein at least 70% of the hydroxyl groups of the esters of pentaerythritol are esterified; and
        optionally 5 to just less than 50% by weight of a component (B) selected from fatty alcohols containing 8 to 32 carbon atoms, fatty acids having 8 to 36 carbon atoms, or mixtures of monoesters and diesters of glycerol which are miscible with the polyol ester (A) and contains groups more polar than the carboxylate ester groups of the polyol ester (A) wherein the foam control agent (i) and the additive composition (ii) are supported on a particulate carrier with the proviso that a mixture of (i) and (ii) is deposited onto the particulate carrier in non-aqueous liquid form.

2. A granulated foam control composition according to claim 1, characterized in that the glycerol triester (A) is esterified by carboxylate groups each having 14 to 22 carbon atoms.

3. A foam control composition according to claim 2, characterized in that glycerol tripalmitate forms at least 30% by weight of the glycerol triester.

4. A granulated foam control composition according to claim 1, characterized in that the polysiloxane fluid is a polysiloxane comprising at least 10% diorganosiloxane units of the formula

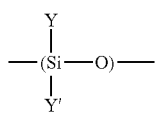

and up to 90% diorganosiloxane units of the formula

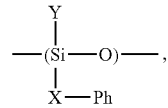

wherein X denotes a divalent aliphatic organic group bonded to silicon through a carbon atom; Ph denotes an aromatic group; Y denotes an alkyl group having 1 to 4 carbon atoms; and Y' denotes an aliphatic hydrocarbon group having 1 to 24 carbon atoms with the proviso that the mean number of carbon atoms in the groups R is at least 1.3.

5. A granulated foam control composition according to claim 1, characterized in that the polysiloxane fluid is a polysiloxane comprising 50-100% diorganosiloxane units of the formula

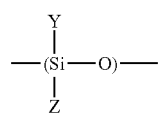

and optionally up to 50% diorganosiloxane units of the formula

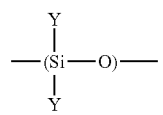

wherein Y denotes an alkyl group having 1 to 4 carbon atoms and Z denotes an alkyl group having 6 to 18 carbon atoms.

6. A granulated foam control composition according to claim 1, characterized in that the organosilicon resin is a siloxane resin consisting of monovalent trihydrocarbonsiloxy (M) groups of the formula $R''_3SiO_{1/2}$ and tetrafunctional (Q) groups $SiO_{4/2}$ wherein R'' denotes an alkyl group and the number ratio of M groups to Q groups is in the range 0.4:1 to 1.1:1.

7. A granulated foam control composition according to claim 1, characterized in that the hydrophobic filler has an average particle size of from 0.5 to 30μm.

8. A granulated foam control composition according to claim 1, characterized in that the additive composition is present at 20-200% by weight based on the polysiloxane fluid.

9. A granulated foam control agent according to claim 1, characterized in that a water-soluble or water-dispersible binder is also supported on the particulate carrier.

10. A granulated foam control composition according to claim 1, wherein the glycerol triester is selected from glycerol tripalmitate, glycerol tristearate, or glycerol triesters of saturated carboxylic acids having 20 or 22 carbon atoms.

11. A granulated foam control composition according to claim 1, wherein the mixture of polyol esters containing carboxylate groups of different chain length is selected from a mixture of glyceryl tristearate and glyceryl tripalmitate, a mixture of glyceryl tristearate and glycerol triesters of saturated carboxylic acids having 20 or 22 carbon atoms, or ethylene glycol distearate and glycerol triesters of saturated carboxylic acids having 20 or 22 carbon atoms.

12. A method of manufacturing a granulated foam control composition comprising:

mixing:
(i) a foam control agent comprising:
a polydiorganosiloxane fluid comprising units of the formula

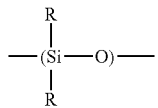

where each group R, which may be the same or different, is selected from an alkyl group having 1 to 36 carbon atoms or an aryl group or aralkyl group having up to 36 carbon atoms, the mean number of carbon atoms in the groups R being at least 1.3;
a hydrophobic filler dispersed in the polydiorganosiloxane fluid; and
optionally an organosilicon resin; and
(ii) an additive composition of melting point 35 to 100° C. comprising:
(A) a polyol ester selected from glycerol triesters, esters of pentaerythritol, or a mixture of polyol esters containing carboxylate groups of different chain length each having 7 to 36 carbon atoms, wherein at least 90% of the hydroxyl groups of the glycerol triesters are esterified, and wherein at least 70% of the hydroxyl groups of the esters of pentaerythritol are esterified; and
optionally 5 to just less than 50% by weight of a component (B) selected from fatty alcohols containing 8 to 32 carbon atoms, fatty acids having 8 to 36 carbon atoms, or mixtures of monoesters and diesters of glycerol which are miscible with the polyol ester (A) and contains groups more polar than the carboxylate ester groups of the polyol ester (A); and
depositing the mixture of (i) and (ii) on a particulate carrier with the proviso that the mixture of (i) and (ii) is in non-aqueous liquid form prior to depositing it onto the particulate carrier.

13. A method of manufacturing a granulated foam control composition according to claim 12, wherein the glycerol triester is selected from glycerol tripalmitate, glycerol tristearate, or glycerol triesters of saturated carboxylic acids having 20 or 22 carbon atoms.

14. A method of manufacturing a granulated foam control composition according to claim 12, wherein the mixture of polyol esters containing carboxylate groups of different chain length is selected from a mixture of glyceryl tristearate and glyceryl tripalmitate, a mixture of glyceryl tristearate and glyceryl triesters of saturated carboxylic acids having 20 or 22 carbon atoms, or ethylene glycol distearate and glyceryl triesters of saturated carboxylic acids having 20 or 22 carbon atoms.

* * * * *